(12) United States Patent
Hogan et al.

(10) Patent No.: US 12,308,762 B2
(45) Date of Patent: May 20, 2025

(54) CONTROLLER FOR POWER CONVERTER

(71) Applicant: Hamilton Sundstrand Corporation, Charlotte, NC (US)

(72) Inventors: Diarmaid Hogan, County Cork (IE); Grzegorz Ryszard Popek, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 105 days.

(21) Appl. No.: 18/173,444

(22) Filed: Feb. 23, 2023

(65) Prior Publication Data

US 2023/0283199 A1  Sep. 7, 2023

(30) Foreign Application Priority Data

Feb. 23, 2022  (EP) .................................... 22275019

(51) Int. Cl.
*H02P 27/06* (2006.01)
*H02M 7/487* (2007.01)
(Continued)

(52) U.S. Cl.
CPC ......... *H02M 7/487* (2013.01); *H02M 7/5395* (2013.01); *H02P 27/08* (2013.01)

(58) Field of Classification Search
CPC ..... H02P 27/08; H02M 7/5395; H02M 7/487; Y02B 70/10
(Continued)

(56) References Cited

U.S. PATENT DOCUMENTS 8,929,114 B2   1/2015  Li et al.
9,325,252 B2   4/2016  Narimani et al.
(Continued)

FOREIGN PATENT DOCUMENTS

EP   2323249 A1   5/2011
EP   3188355 A1   7/2017
(Continued)

OTHER PUBLICATIONS

Akbari, et al. "Modeling and Simulation of Dual Z-source based Hybrid 2/3 Level Inverter" 2021 12th Power Electronics, Drive Systems, and Technologies Conference (pedstc), IEEE, Feb. 2, 2021, pp. 1-7.
(Continued)

*Primary Examiner* — Gabriel Agared
(74) *Attorney, Agent, or Firm* — CANTOR COLBURN LLP

(57) ABSTRACT

A controller for a power converter. The controller is configured to provide a plurality of switching signals to a power converter for use in modulating an output voltage thereof, wherein the controller comprises: one or more comparators, each configured to compare an instantaneous value of an input carrier signal with a reference signal, and output a respective signal; circuitry configured to receive the respective signal(s) from the one or more comparators and transmit a first switching signal for transmission to a first switch and a second switching signal for transmission to a second switch, wherein the second switching signal is a negative of the first switching signal such that they form a first complementary pair; a further comparator configured to compare the reference signal with zero, and output a respective signal.

11 Claims, 4 Drawing Sheets

(51) Int. Cl.
*H02M 7/5395* (2006.01)
*H02P 27/08* (2006.01)

(58) Field of Classification Search
USPC .......................................... 318/504
See application file for complete search history.

(56) References Cited

U.S. PATENT DOCUMENTS

| 9,979,322 B2 | 5/2018 | Zhang et al. |
| 10,063,161 B2 | 8/2018 | Li et al. |
| 10,191,531 B2 | 1/2019 | Zhang et al. |
| 10,243,482 B2 | 3/2019 | White |
| 2011/0115532 A1* | 5/2011 | Roesner ............... H02M 7/003 307/115 |
| 2014/0063885 A1* | 3/2014 | Itoh ..................... H02M 7/483 363/132 |
| 2017/0185130 A1* | 6/2017 | Zhang .................. H01L 29/1608 |
| 2020/0099287 A1* | 3/2020 | Chen ..................... H02M 7/06 |
| 2020/0204190 A1* | 6/2020 | Rattan ................... H03M 1/78 |
| 2020/0228014 A1 | 7/2020 | Wu et al. |

FOREIGN PATENT DOCUMENTS

| EP | 3291435 A1 | 3/2018 |
| WO | WO-2021248223 A1 * | 12/2021 .......... H02M 1/0095 |

OTHER PUBLICATIONS

European Search Report for Application No. 22275019.2, mailed Jul. 29, 2022, 11 pages.

Tsoumas, et al. "Optimal Hybrid Modulation of the 5LANPC Converter", IECON 2017—43rd Annual Conference of the IEEE Industrial Electronics Society, IEEE, Oct. 29, 2017, pp. 1363-1368.

* cited by examiner

CONTROLLER FOR POWER CONVERTER

CROSS-REFERENCE TO RELATED APPLICATIONS

This application claims priority to European Patent Application No. 22275019.2 filed Feb. 23, 2022, the entire contents of which is incorporated herein by reference.

FIELD

The present disclosure relates to a controller (otherwise known as a modulator) for providing switching signals to a power converter, and more particularly to multilevel inverters for converting direct current (DC) voltage to alternating current (AC) voltage. The disclosure is primarily aimed at providing such a controller in a hybrid active neutral-point-clamped (hANPC) converter. The disclosure is more specifically aimed at providing these features in a very high power environment, such as a propulsion system (e.g., for an aircraft or land-based power generation).

BACKGROUND

Inverters convert DC voltage into AC voltage. Multilevel inverters employ multiple voltage levels and solid-state switch devices. The multiple voltage levels are generally formed by connections to a positive DC terminal, a negative DC terminal and a middle DC terminal having a potential greater than the negative DC terminal and less than the positive DC terminal. A controller cycles the solid-state switch devices between on and off states to generate output AC voltage, for example using a waveform approximating a sinusoidal waveform. The solid-state switch devices are generally either insulated gate bipolar transistors (IGBTs) or field effect transistors (MOSFETs) grouped into one or more phase legs.

The inverter will typically use a controller (otherwise known as a modulator) that is configured to implement a modulation scheme for the switches based on input signals. Developments in this field have tended towards the structure of the converter, while the structure of the controller is often not clear (or not disclosed). In other words, the prior art is typically silent on the means (e.g., circuitry) for the controller, which controls the switching signals and transmits them to each of the switch devices.

The present disclosure, therefore, relates to the structure of the controller, and is aimed at optimising the cost versus efficiency of very high power converters, for example those used in propulsion systems.

SUMMARY

According to an aspect there is provided a controller for a power converter. Such a controller may be referred to as a modulator, which could be for providing switching signals to the power converter for converting a direct current (DC) voltage to alternating current (AC) voltage. The controller may be implemented in a hybrid active neutral-point-clamped (hANPC) converter. The power converter may be used in a propulsion system (e.g., for an aircraft or land-based power generation).

The controller is configured to provide a plurality of switching signals to a power converter for use in modulating an output voltage thereof.

The controller comprises one or more comparators, each configured to compare an instantaneous value of an input carrier signal with a reference signal, and output a respective signal.

The controller further comprises circuitry configured to receive the respective signal(s) from the one or more comparators and transmit a first switching signal for transmission to a first switch and a second switching signal for transmission to a second switch, wherein the second switching signal is a negative of the first switching signal such that they form a first complementary pair.

The controller further comprises a further comparator configured to compare the reference signal with zero and output a respective signal.

The controller further comprises circuitry configured to receive the respective signal from the further comparator and transmit a plurality of further switching signals for transmission to a plurality of further switches, wherein the further switching signals comprise pairs of signals, each pair comprising a primary signal and a negative of the primary signal such that each pair of signals form further complementary pairs.

The one or more comparators may include a first comparator and a second comparator. The first comparator may be configured to compare an instantaneous value of a first input carrier signal with the reference signal, and output a first signal, and the second comparator may be configured to compare an instantaneous value of a second input carrier signal with the reference signal and output a second signal.

The circuitry that is configured to receive the respective signal(s) from the one or more comparators may include a multiplexer (i.e., processor or circuitry) configured to receive the first and second signals from the first and second comparators, and select between and output one of the first and second signals, such that the signal output from the multiplexer corresponds to the first switching signal for transmission to the first switch. The multiplexer may be configured to direct at its output the first signal or the second signal depending on the value of the reference signal. The multiplexer may be configured to direct at its output the first signal or the second signal depending on the value of the reference signal being greater than zero.

The controller may further comprise circuitry configured to apply a delay to one or more of the switching signals.

The one or more comparators may be configured to generate at their output logic '1' when the reference signal is greater than the respective carrier signal, such that each of the one or more comparators outputs a binary value.

The further comparator may be configured to generate at its output logic '1' when the reference signal is less than or equal to zero, such that the further comparator outputs a binary value.

According to an aspect there is provided a power converter comprising the controller described in any of the above embodiments.

The power converter may comprise at least one phase leg configured to convert an input DC voltage to a phase of an output AC voltage. The phase leg(s) may include a plurality of switches configured to vary the output voltage of the phase leg. The controller may be configured to provide the plurality of switching signals to the phase leg(s) of the power converter to modulate the output voltage thereof.

The phase leg(s) may comprise a first group of the switches and a second group of the switches, wherein the first group differ from the second group according to a characteristic. For example, the first group of switches may be relatively low frequency switching devices, and the second group of switches may be relatively high frequency switching devices.

The controller may be configured to transmit the first complementary pair of switching signals to the second group of switches, and to transmit the further complementary pairs of signals to the first group of switches.

According to an aspect there is provided a motor comprising the power converter as described in any of the above embodiments thereof.

According to an aspect there is provided a propulsion engine comprising the motor as described above.

According to an aspect there is provided a method of controlling how a plurality of switching signals are provided to a power converter for use in modulating an output voltage thereof. The method comprises: using one or more comparators to compare an instantaneous value of an input carrier signal with a reference signal, and output a respective signal; receiving the respective signal(s) from the one or more comparators and transmitting a first switching signal for transmission to a first switch and a second switching signal for transmission to a second switch, wherein the second switching signal is a negative of the first switching signal such that they form a first complementary pair; using a further comparator to compare the reference signal with zero, and output a respective signal; and receiving the respective signal from the further comparator and transmitting a plurality of further switching signals for transmission to a plurality of further switches, wherein the further switching signals comprise pairs of signals, each pair comprising a primary signal and a negative of the primary signal such that each pair of signals form further complementary pairs.

BRIEF DESCRIPTION

Various embodiments will now be described, by way of example only, and with reference to the accompanying drawings in which.

DETAILED DESCRIPTION

Figure 1:
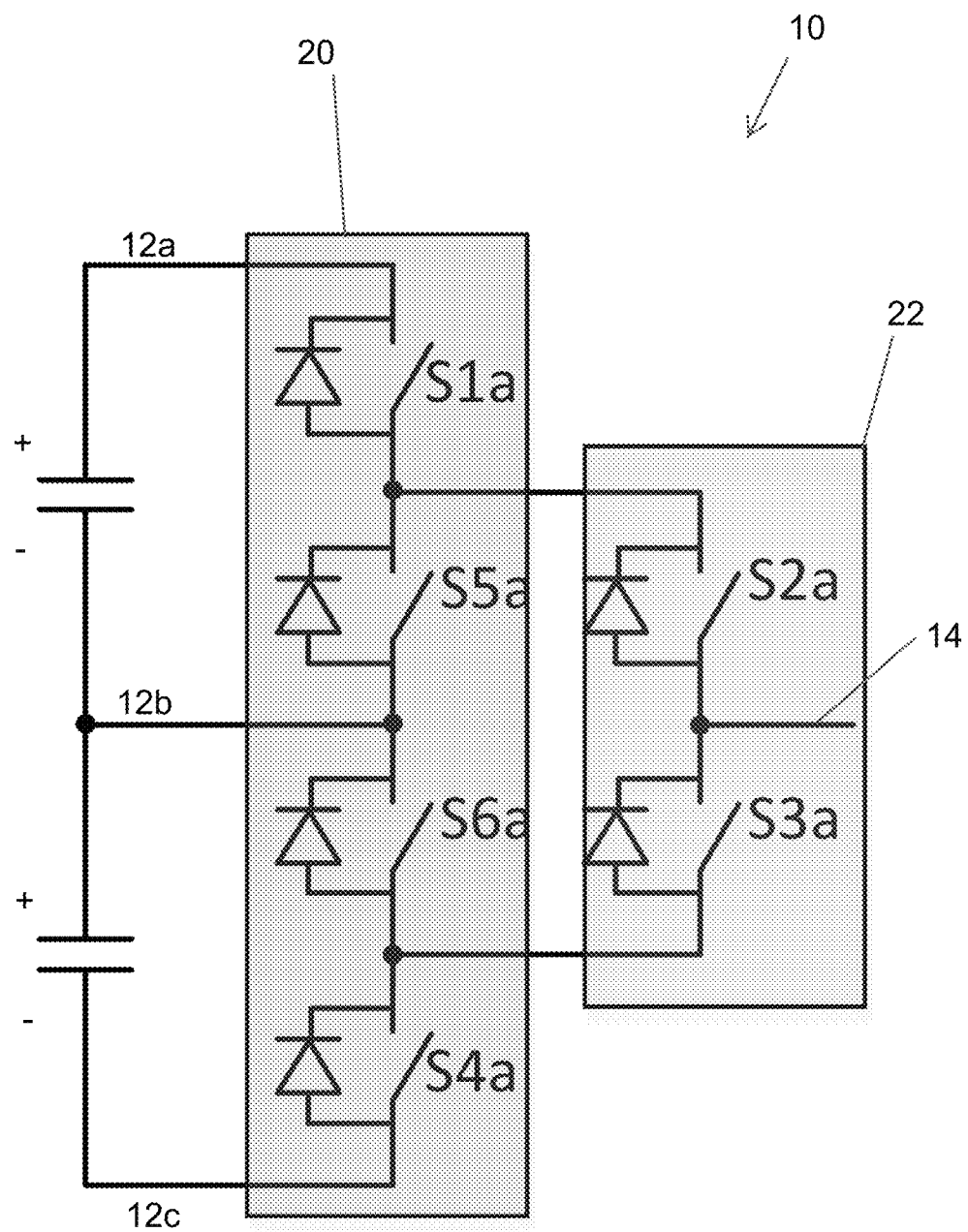
FIG. 1 shows an arrangement of a multilevel power converter phase leg with switch devices.
Figure 4:
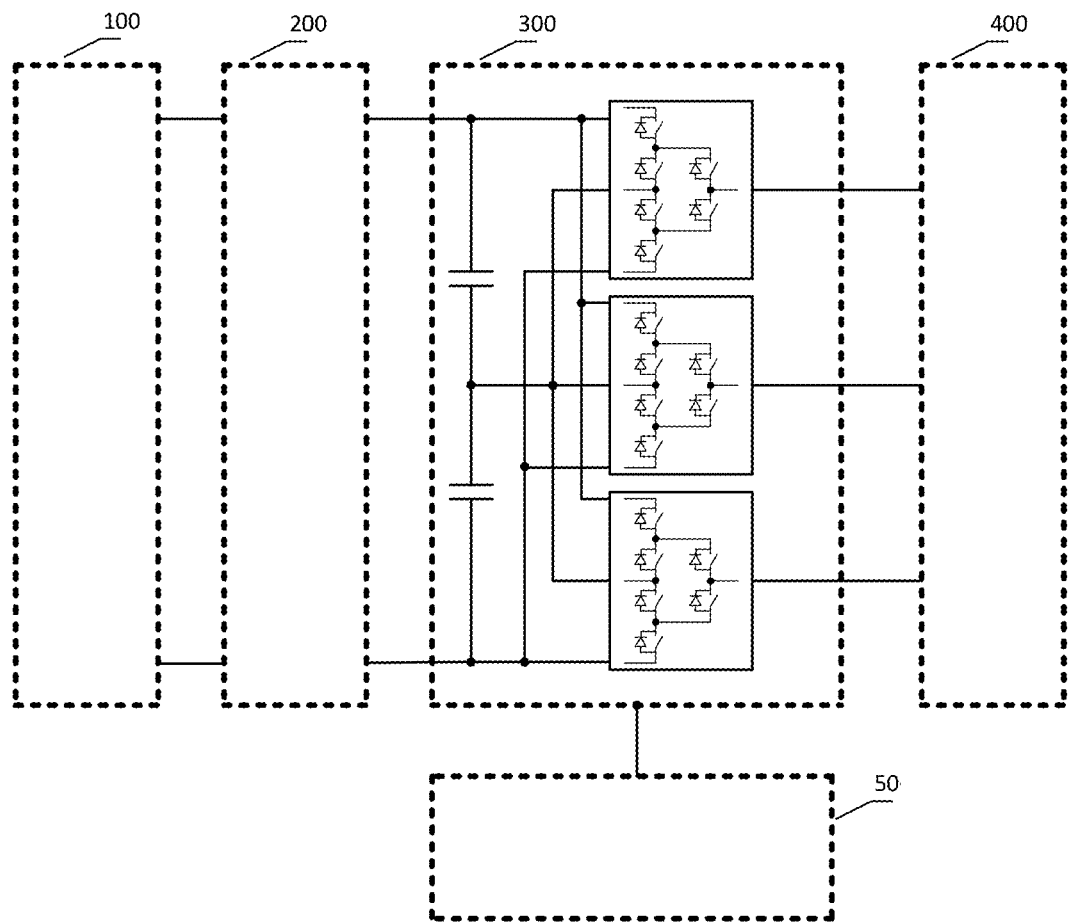
FIG. 4 shows schematically a system including a power source, power converter, load and a controller according to FIG. 3.

FIG. 1 shows an arrangement of a multilevel power converter phase leg 10 with switch devices labelled S1a-S6a. The phase leg 10 may be combined with other similar phase legs to provide the multilevel power converter as is known in the art. This could be included in a system as shown in FIG. 4 and described below.

Each phase leg 10 includes a number of solid-state switch devices S1a-S6a, four of which (labelled S1a, S5a, S6a and S4a) are connected in series to form a first group 20.

The outer S1a, S4a of the serially connected devices in the first group 20 connect directly to positive and negative DC terminals via positive DC lead 12a and negative DC lead 12c respectively. The inner S5a, S6a of the serially-connected devices in the first group 20 are directly connected to one another, and indirectly connected to the positive and negative terminals through the outer devices S1a, S4a. A middle DC lead 12b connects to terminals located between the inner solid-state switch devices S5a, S6a.

Each phase leg 10 further comprises a second group 22 of the solid-state switch devices, in this case two serially connected devices S2a, S3a that are connected to terminals located between each pair of inner and outer solid-state switch devices (i.e., the pair labelled S1a and S5a, and the pair labelled S6a and S4a).

The first group 20 of the solid state switch devices may be provided as low frequency switching devices, and the second group 22 of the solid state switch devices may be provided as high frequency switching devices, as discussed in further detail below.

An output AC phase lead 14 is connected to terminals located between the two serially connected devices S2a, S3a of the second group 22 of the solid-state switch devices. The output AC phase lead 14 may be combined with other output AC phase leads of the power converter so that an input DC voltage can be converted to AC output voltage as is known in the art, that is by varying the output voltages of each phase lead 10, typically in a stepwise manner, e.g., by approximating a sinusoidal AC voltage waveform.

It is known that multilevel power converters offer benefits such as better efficiency at higher switching frequencies, reduction in EMI, and reduced transmission-line effects. Also when utilized as active rectifiers they can reduce the size of an input boost inductor. Multilevel power converters can be realized in various topologies (T-types, NPC, MMC etc) providing different benefits depending on the application.

The embodiments of this disclosure are directed to a hybrid active neutral-point-clamped (hANPC) power converter. The hANPC converter is a derivative of an ANPC converter and differs only in the mode of operation. That is, the hANPC converter (as shown in FIG. 1) consists of six switches S1a-S6a per phase leg 10, wherein the first group 20 of switches S1a, S5a, S6a, S4a are switched with a relatively low frequency (e.g., as defined by a fundamental component of a synthetized waveform), and the second group 22 of switches S2a, S3a are switched with a relatively fast frequency (e.g., much higher than the fundamental component).

This hANPC approach facilitates the design of a converter that is able to utilise slow (or otherwise low cost) switches for the fundamental switching elements of the first group 20, with faster (or otherwise more expensive) switches for the second group 20. For example, the second group 20 of switches could be used for pulsed width modulation (PWM) operation. The second group 20 of switches could consist of GaN or SiC switches.

This approach enables cost efficiency optimisation for propulsion power converters, e.g., those configured to operate at a megawatt (MW) level. Such hANPC converters can also facilitate the development of drives for smaller power and/or simpler to manufacture motors (such as axial flux motors). These may require extremely fast PWM switching due to their very low inductance (for example, a combination of Si—GaN hybrid may be desirable for such applications). The hANPC approach can also enable the use of GaN switches in high voltage (e.g., 600V) DC leads due to reduced voltage stress.

Existing research around control of hANPC converters is focused on space vector modulation (SVM) to generate the appropriate switching signals for the high and low frequency elements of the circuit. However, SVM is computationally heavy and computations can limit the maximum switching frequency of the entire hANPC converter.

Accordingly, the present disclosure relates to a new architecture for a controller (otherwise referred to as a controller) for an hANPC converter, such as that described above with reference to FIG. 1.

Figure 2:
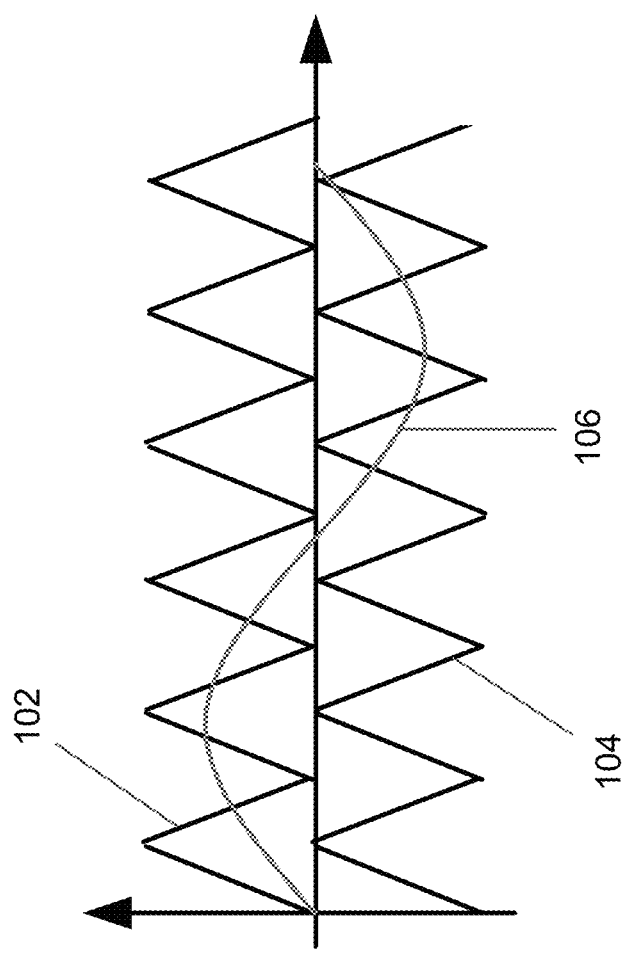
FIG. 2 shows two triangle wave carrier signals that are in-phase, and which are compared to a reference waveform that is representative of the output sinusoidal voltage to be synthesised.

The controller of the present disclosure may be configured to implement pulse width modulation (PWM), a version of which is illustrated schematically in FIG. 2.

As can be seen, in the FIG. 2 implementation there are two triangle wave carrier signals 102, 104 that are in-phase (i.e., not offset or otherwise phase shifted), which are compared (by the controller) to a reference waveform 106 that is representative of the output sinusoidal voltage to be synthesised. The use of two carriers is not essential, and only one could be used within the broadest aspects of the present disclosure.

The reference waveform 106 may be generated according to any suitable input, such as comparison of a desired system operating condition (e.g., setpoint) with one or more feedback signals. The controller may then employ suitable logic or programming (circuitry) configured to implement the switching control signals for the switches (e.g., the switches S1a-S6a of FIG. 1) of the power converter.

For example, the controller may be configured to implement a sine-triangle modulation using signal generator circuitry and suitable hardware comparators in order to generate digital values representing the carriers 102, 104 and perform the comparisons to the reference signal(s) 106 in firmware/software, for example using suitable processor circuitry programmed with corresponding programming instructions.

Figure 3:
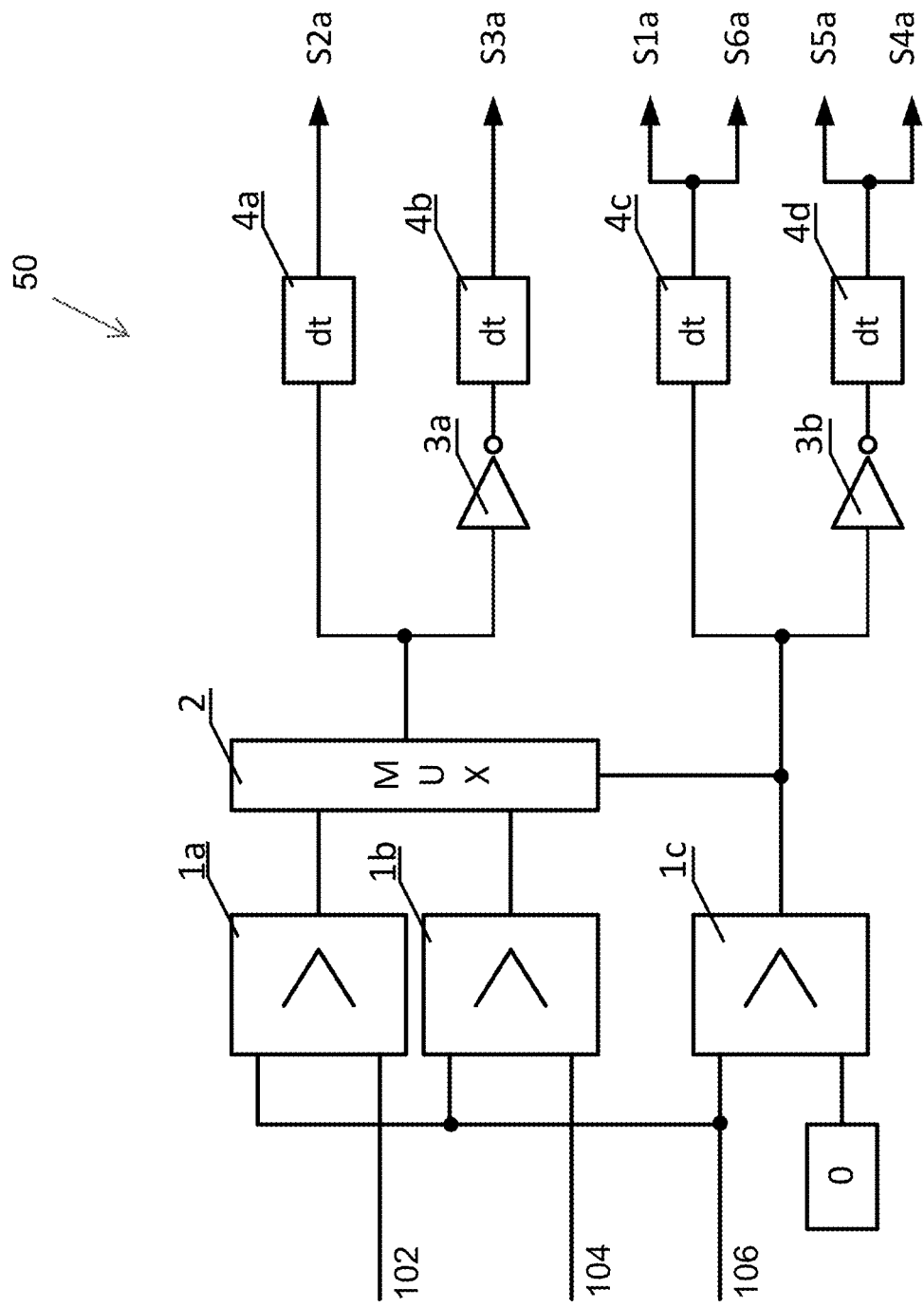
FIG. 3 shows schematically the layout of a controller configured to implement pulse width modulation as shown in FIG. 2.

FIG. 3 shows schematically the layout of a controller 50 (otherwise known as a modulator) configured as above to implement pulse width modulation as shown in FIG. 2.

As noted above the inputs of the controller 50 are based on two carrier signals 102, 104 (which define the switching frequency of the high frequency switches), and a reference waveform 106 that is representative of the output sinusoidal voltage to be synthesized.

The controller 50 comprises a plurality of comparators 1a, 1b, 1c configured to compare instantaneous values of two input signals and output a binary (digital) value. The controller 50 further comprises a multiplexer 2 that comprises the output of a first of the comparators 1a and a second of the comparators 1b as input signals, and which multiplexer 2 is configured to select between the input signals (as described below) and forward the selected input to a single output line.

The first comparator 1a is configured to compare the first carrier signal 102 with the reference waveform 106 and output a binary value to the multiplexer 2, and similarly the second comparator 1b is configured to compare the second carrier signal 104 with the reference waveform 106 and output a binary value to the multiplexer 2.

The output of the multiplexer 2 may be used to generate the switching signals for the high frequency switches S2a and S3a.

Regarding the low frequency switches S1a, S6a, S5a, S4a, these may be controlled in part by signals originating from a third of the comparators 1c. That is, the third comparator 1c is configured to compare the instantaneous value of the reference signal 106 with zero and output a binary (digital) value.

The output of the third comparator 1c is then sent to switches S1a and S6a, which are equal to each other, as well as switches S5a and S4a (although negated in this instance), such that the signals sent to S1a with S6a correspond to a low frequency complementary pair with S5a and S4a. To confirm, this complementary pair is generated by comparing the instantaneous value of the desired signal, in this case the reference signal 106 with zero by utilising the third comparator 1c.

The output of the third comparator 1c may go through circuitry 4c, which is configured to briefly delay the rise time of the output signal to facilitate short-circuit protection when switching. This operation (or simply the output of comparator 1c if no delay is provided) generates the switching signals for switches S1a and S6a, while the complementary pair (corresponding to the switching signals for switches S5a and S4a) is generated by negating the result of the output of the third comparator using appropriate circuitry 3b. A similar and optionally equal delay could be applied to this signal by appropriate circuitry 4d, so as to delay the rising edge of the signal in the same manner.

The optional utilisation of a delay time applied to the rising edges of the complementary pairs S1a, S6a and S5a, S4a may be characterised by the interlocking time (or "dead time") as defined by a time delay parameter of the circuitry 4c and 4d.

As noted above, the complementary signal pair that controls the high frequency switches S2a and S3a is generated by the output of the first and second comparators 1a, 1b in such a manner that when the reference signal is greater than zero the multiplexer 2 directs at its output the result of the comparison realised by the first comparator 1a. When the reference signal is less than or equal to zero the multiplexer 2 directs at its output the result from the second comparator 1b.

The first comparator 1a generates at its output logic '1' when the reference signal is greater than the first carrier signal 102, and the second comparator 1b generates at its output logic '1' when the reference signal is greater than the second carrier signal 104.

The signal for the switch S3a is generated by negating the output of the multiplexer 2 using appropriate circuitry 3a, so as to generate the appropriate complement to the signal for the switch S2a. These signals (for the high frequency switches S2a and S3a) may also be characterised by application of a delay (interlock or "dead time") by appropriate circuitry 4a, 4b, which applies a time delay to the rising edges of these signals, again to facilitate short-circuit protection when switching.

The inputs to the controller 50 (i.e., the carrier and reference signals 102, 104, 106) are typical 3-phase system inputs, which could be derived for example from current values of a motor drive or other power converter. They could also be derived from an active rectifier.

The outputs of the controller 50 are the switching signals for the switches S1a-S6a, otherwise known as the gate drive signals.

FIG. 4 shows schematically a system including a power source 100, EMI filter 200, power converter 300, load 400 and controller 50 (e.g., as described above). The power converter 300 is shown as including three phase legs, each of which could be a phase leg 10 as described above. The present invention focuses on the controller 50, which as noted could be referred to as a modulator. The above described embodiments are exemplary in nature, and it should be noted that variations are possible as would be recognised by one of skill in the art, without departing from the scope of the invention as defined by the claims. For example, the proposed implementation can work in negated logic and carrier signals being not in phase and/or having slightly different switching frequencies to those shown and described.

The technology described herein enables a cost and efficiency optimisation for high power converters, such as those for propulsion devices. For example, the technology enables relatively slow and inexpensive switches that operate with the fundamental frequency, and more complex/faster switches that operate at the higher frequencies. The disclosure enables ultra-fast switching frequencies, for example allowing utilisation of Si—GaN hybrid or GaN switches. This can provide novel motor drives for axial flux machines or implementation of a very fast bidirectional rectifier that reduces the size of the passive devices. The present technology also enables ultra-fast switching, for example by using GaN devices in high voltage applications (e.g., voltage leads greater or equal to 600 V), overcoming limits of GaN devices which is it voltage ratings (currently majority of GaN devices are limited to 650V blocking).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A power converter comprising:
a controller, the controller comprising:
one or more comparators, each configured to compare an instantaneous value of an input carrier signal with a reference signal, and output a respective signal;
wherein the controller is configured to provide a plurality of switching signals,
wherein the controller further comprises:
circuitry configured to receive the respective signal(s) from the one or more comparators and transmit a first switching signal for transmission to a first switch and a second switching signal for transmission to a second switch, wherein the second switching signal is a negative of the first switching signal such that they form a first complementary pair;
a further comparator configured to compare the reference signal with zero, and output a respective signal; and
circuitry configured to receive the respective signal from the further comparator and transmit a plurality of further switching signals for transmission to a plurality of further switches, wherein the further switching signals comprise pairs of signals, each pair comprising a primary signal and a negative of the primary signal such that each pair of signals form further complementary pairs;
wherein the power converter further comprises:
at least one phase leg configured to convert an input DC voltage to a phase of an output AC voltage, wherein the at least one phase leg includes a first group of switches and a second group of switches, wherein the first and second groups are configured to vary the output voltage of the at least one phase leg, and wherein the first group of switches has a lower switching frequency than the second group of switches;
wherein the controller is configured to provide the plurality of switching signals to the at least one phase leg of the power converter to modulate the output voltage thereof;
wherein the one or more comparators includes:
a first comparator configured to compare an instantaneous value of a first input carrier signal with the reference signal, and output a first signal; and
a second comparator configured to compare an instantaneous value of a second input carrier signal with the reference signal, and output a second signal;
wherein the first input carrier signal is different that the second input carrier signal.

2. The power converter of claim 1, wherein the circuitry configured to receive the respective signal(s) from the one or more comparators includes a multiplexer configured to receive the first and second signals from the first and second comparators, and select between and output one of the first and second signals, such that the signal output from the multiplexer corresponds to the first switching signal for transmission to the first switch.

3. The power converter of claim 2, wherein the multiplexer is configured to direct at its output the first signal or the second signal depending on the value of the reference signal.

4. The power converter of claim 2, wherein the multiplexer is configured to direct at its output the first signal or the second signal depending on the value of the reference signal being greater than zero.

5. The power converter of claim 1, further comprising circuitry configured to apply a delay to one or more of the switching signals.

6. The power converter of claim 1, wherein the one or more comparators are configured to generate at their output logic '1' when the reference signal is greater than the respective carrier signal, such that each of the one or more comparators outputs a binary value.

7. The power converter of claim 1, wherein the further comparator is configured to generate at its output logic '1' when the reference signal is less than or equal to zero, such that the further comparator outputs a binary value.

8. The power converter of claim 1, wherein the controller is configured to transmit the first complementary pair of switching signals to the second group of switches, and to transmit the further complementary pairs of signals to the first group of switches.

9. A motor comprising:
the power converter as claimed in claim 1.

10. A propulsion engine comprising:
the motor as claimed in claim 9.

11. A method of controlling how a plurality of switching signals are provided to a power converter for use in modulating an output voltage thereof,
wherein the method comprises:
using one or more comparators to compare an instantaneous value of an input carrier signal with a reference signal, and output a respective signal;
receiving the respective signal(s) from the one or more comparators and transmitting a first switching signal for transmission to a first switch and a second switching signal for transmission to a second switch, wherein the second switching signal is a negative of the first switching signal such that they form a first complementary pair;
using a further comparator to compare the reference signal with zero, and output a respective signal; and
receiving the respective signal from the further comparator and transmitting a plurality of further switching signals for transmission to a plurality of further switches, wherein the further switching signals comprise pairs of signals, each pair comprising a primary signal and a negative of the primary signal such that each pair of signals form further complementary pairs;
converting an input DC voltage to a phase of an output AC voltage using at least one phase leg of the power converter, wherein the at least one phase leg includes a first group of switches configured to vary the output voltage of the at least one phase leg and a second group of switches configured to vary the output voltage of the at least one phase leg, wherein the first group of switches has a lower switching frequency than the second group of switches;
providing the plurality of switching signals to the at least one phase leg of the power converter to modulate the output voltage thereof;
using a first comparator of the one or more comparators to compare an instantaneous value of a first input carrier signal with the reference signal, and output a first signal; and
using a second comparator of the one or more comparators to compare an instantaneous value of a second input carrier signal with the reference signal, and output a second signal;
wherein the first input carrier signal is different than the second input carrier signal.

* * * * *